UNITED STATES PATENT OFFICE.

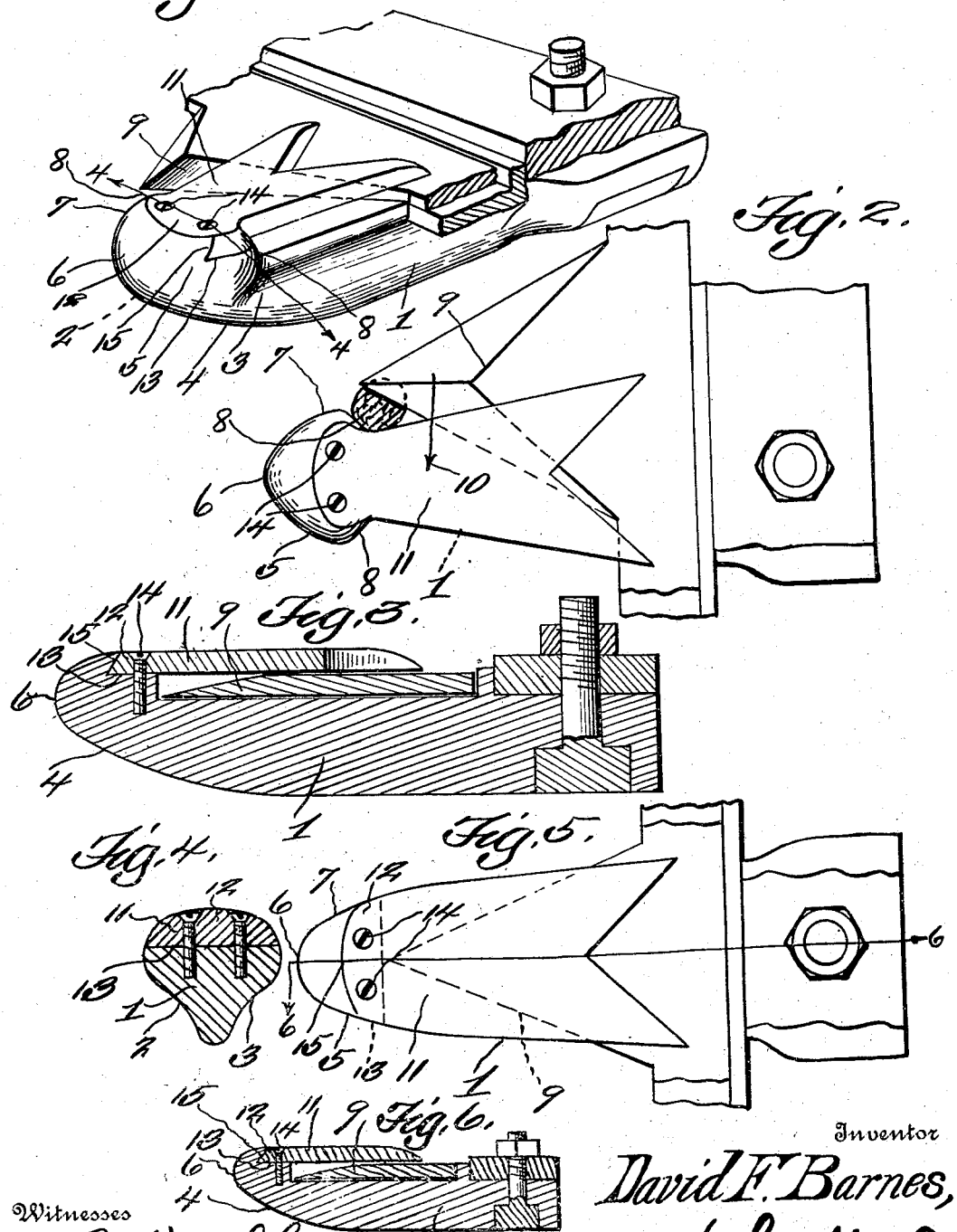

DAVID F. BARNES, OF COLERIDGE, NEBRASKA.

BINDER-SICKLE GUARD OR TOOTH.

1,104,240.  Specification of Letters Patent. Patented July 21, 1914.

Application filed January 17, 1914. Serial No. 812,614.

*To all whom it may concern:*

Be it known that I, DAVID F. BARNES, a citizen of the United States, residing at Coleridge, in the county of Cedar and State of Nebraska, have invented a new and useful Binder-Sickle Guard or Tooth; and I do hereby declare the following to be a full, clear, and exact description of the invention, such as will enable others skilled in the art to which it appertains to make and use the same.

This invention relates to a new and useful improved sickle bar guard or tooth. As far as known such guards have been made sharp and pointed, and it has been found that they are continually catching or piercing the stalks, thereby clogging the binder or retarding the same. Such guards when catching or piercing the stalks causes the same to be bent downwardly, in which case the binder will pass over the stalks, without the sickle bar cutting them.

Therefore, it is the aim of the present invention to overcome the above difficulties or disadvantages, by providing a guard having a rounding point, so that the stalks will be deflected to one side of the guard.

Another object of the invention is to so construct the guard adjacent the rounded ends as to provide means forming abutments to be engaged by the stalk when deflected to one side, so that the sickle bar will easily sever the same.

In practical fields the details of construction may be subjected to alterations, falling within the scope of what is claimed.

The invention comprises further features and combination of parts, as hereinafter set forth, shown in the drawings and claimed.

In the drawings:—Figure 1 is a view showing the improved guard constructed in accordance with the invention. Fig. 2 is a plan view, showing the position of the stalk after the same has been deflected. Fig. 3 is a sectional view longitudinally through the guard. Fig. 4 is a transverse sectional view on line 4—4 of Fig. 1. Fig. 5 is a plan view showing the abutment omitted. Fig. 6 is a sectional view longitudinally through Fig. 5.

Referring more especially to the drawings, 1 designates the guard, the under surface or portion of which as shown at 2 and 3 is V-shaped, so that the guard will slide over the soil as the binder frame (not shown) vibrates. That is, as the binder (not shown) passes over the soil, the frame carrying the sickle bar vibrates, and as it vibrates downwardly the V-shaped lower portion of the guard engages the soil and slides easily thereover, especially because of the tapering edge 4 shown in the sectional view.

Instead of constructing the guard sharp and pointed, the same is rounded, as shown at 5, 6 and 7, so that as it comes in contact with the stalk, the stalk is deflected to one side or the other, and when deflected, the same engages the shoulder 8 on either side of the guard, which shoulder acts as an abutment for the stalk while the same is severed by the sickle bar 9, as shown in Fig. 2. In other words, it will be seen in Fig. 2 that as the sickle bar 2 moves in the direction of the arrow 10, the stalk is easily severed without forcing the stalk forwardly of the guard, because the abutment prevents it. The sickle bar moves in the recessed portion of the guard, under the cover 11 of the guard, the end 12 of the cover seats in a recess 13 of the guard and is secured in place as shown at 14, the end wall 15 of the recess overhanging the end of the cover partially.

In Fig. 5 the abutments are omitted, otherwise the structure is similar to that shown in the other figures.

The invention having been set forth, what is claimed as new and useful is:—

A sickle bar tooth guard comprising a body portion having a recess for the sickle bar to move therein, the body portion of the guard having a rounded end and upon its upper surface adjacent said end a recess, a cover plate having one of its ends secured in the recess adjacent the rounded end, the end wall of the recess of the rounded end overhanging the end of the cover, the opposite sides of the rounded end being drawn inwardly to form shoulders with which a stalk contacts while being severed by the sickle bar, the guard adjacent the rounded end tapering downwardly and rearwardly.

In testimony whereof I have signed my name to this specification in the presence of two subscribing witnesses.

DAVID F. BARNES.

Witnesses:
E. L. WAIT,
JNO. SANDROCK.